United States Patent [19]

Gaylord

[11] 3,966,672

[45] June 29, 1976

[54] PREPARATION OF CARBOXYL-CONTAINING POLYMERS AND COMPOSITES THEREOF WITH HYDROXYL-CONTAINING MATERIALS

[75] Inventor: Norman G. Gaylord, New Providence, N.J.

[73] Assignee: Atlantic Richfield Company, Los Angeles, Calif.

[22] Filed: Nov. 20, 1974

[21] Appl. No.: 525,333

[52] U.S. Cl. .............................. 260/42.14; 241/23; 260/878 R; 260/879; 260/887; 260/897 B; 526/329; 528/502
[51] Int. Cl.² ..................... C08K 3/20; C08K 9/04; C08L 13/00; C08L 23/26
[58] Field of Search ................ 260/897 B, 88.1 PC, 260/80.8, 42.14, 879, 878 R, 887; 241/1, 23

[56] References Cited
UNITED STATES PATENTS

| | | | |
|---|---|---|---|
| 2,991,269 | 7/1961 | Nozaki | 260/879 |
| 3,658,948 | 4/1972 | McConnell | 260/897 B |
| 3,708,555 | 1/1973 | Gaylord | 260/878 R |

OTHER PUBLICATIONS

Ceresa — Block & Graft Copolymers (Butterworths) (London) (1962), pp. 66–82 & 88.
Ceresa — Block & Graft Copolymerization (vol. 1) (Wiley) (N.Y.) (1973), pp. 60–63.

*Primary Examiner*—Lewis T. Jacobs
*Assistant Examiner*—H. H. Fletcher
*Attorney, Agent, or Firm*—Coleman R. Reap

[57] ABSTRACT

A process for the preparation of carboxyl-containing polymer products which comprises reacting mono- or diolefin homopolymers or copolymers with a low molecular weight thermoplastic copolymer of a carboxyl-containing monomer and an ethylenically unsaturated monomer copolymerizable therewith under the influence of shearing forces. A process for the preparation of composites is also provided which comprises preparing the carboxyl-containing polymer products in the presence of hydroxyl-containing materials.

18 Claims, No Drawings

PREPARATION OF CARBOXYL-CONTAINING POLYMERS AND COMPOSITES THEREOF WITH HYDROXYL-CONTAINING MATERIALS

BACKGROUND OF THE INVENTION

1. Field of the Invention

This invention relates to a process for preparing novel polymers containing carboxyl groups. More particularly, this invention relates to a process for incorporating carboxylic acid groups into polymers by mixing the polymer and a carboxyl-containing copolymer in a mechanical mixing apparatus.

2. Prior Art

It is well known that as a result of the presence of carboxyl functionality in a polymeric structure, there is an improvement in the properties of the polymer, such as improved solubility properties, receptivity to dyes, adhesion to polymeric and non-polymeric substrates including metals, permeability to gases, interaction with fillers and reinforcing agents and the ability to form polymer alloys and composites.

Carboxyl-containing polymers may be prepared by the copolymerization of an ethylenically unsaturated carboxylic acid such as acrylic acid or maleic acid with a suitable comonomer. This method is limited to monomers which copolymerize with the unsaturated carboxylic acid and to processes involving catalysts which are not deactivated by the carboxylic acid. For example, carboxyl functionality cannot be incorporated by copolymerization into high density polyethylene and isotactic polypropylene since the preparation of these polymers involves organometallic catalysts.

Alternative methods for preparing carboxyl-containing polymers involve grafting and/or reaction of a polymer with an unsaturated acid. Thus, acrylic or methacrylic acid can be grafted onto polyethylene under ionizing radiation (U.S. Pat. No. 3,211,808) while maleic anhydride is grafted onto polypropylene in the presence of an organic peroxide (British Patent No. 1,086,839) and onto polyethylene in the presence of benzoyl peroxide or azobisisobutyronitrile in the presence of air (Gabara and Porejko, J. Polymer Sci., A-1, 5, 1539 (1967).

Carboxyl groups may be appended to an unsaturated polymer by reaction of the latter with maleic anhydride. A low molecular weight polyethylene containing olefinic linkages, prepared by thermal degradation of high molecular weight polyethylene, undergoes reaction with maleic anhydride in the melt or in solution (French Patent No. 1,346,533).

The incorporation of carboxyl groups in a polymer containing aromatic rings, e.g. polystyrene, may be accomplished by ultraviolet irradiation of a solution containing the polymer and maleic anhydride. As a result of the irradiation, the aromatic ring forms an adduct with the maleic anhydride (U.S. Pat. No. 3,214,416).

The addition of a solution of maleic anhydride in styrene to a polymer which contains labile or active hydrogen atoms, at an elevated temperature in the absence of a free radical catalyst, results in the formation of a carboxyl-containing polymer (U.S. Pat. No. 3,708,555).

Each of the foregoing methods for preparing a carboxyl-containing polymer involves the use of a monomeric unsaturated carboxylic acid or anhydride.

The formation of block and/or graft copolymers by mechanochemical methods is a well known art. Under applied shear, polymer chains are ruptured to generate free radical sites at the ruptured ends of the chains. Suitable shear forces are encountered when the polymer is subjected to mechanical deformation in masticating or mixing equipment such as a Banbury mixture, a Brabender Plasticorder, a rubber mill, a screw extruder or any other of the well known mechanical mixing equipment normally used in the processing of thermoplastic, elastomeric or thermosetting polymers. It is generally considered that when a blend of two polymers is subjected to the mechanical degradation which occurs upon application of shear forces, both chains undergo rupture and the resultant macroradicals combine with the formation of block copolymers. Graft copolymers are considered to be formed concurrently as a result of chain transfer reactions, followed by radical coupling or the reaction of macroradicals with unsaturation present in one or both polymers.

In order to rupture polymer chains it is necessary that the polymers be in a viscoelastic state when subjected to shear. In the case of elastomers, the reaction may be carried out at room temperature, e.g. cold milling, since they exist in the viscoelastic state under these conditions. In the case of rigid polymers, the viscoelastic state is attained at elevated temperatures, e.g. above the softening or melting point, or upon swelling with a solvent or monomer.

The melt viscosity and viscoeleasticity of a polymer are a function of molecular weight. The lower the molecular weight of the polymer the lower the melt viscosity and viscoelasticity. The rate of mechanical degradation is proportional to the molecular weight of the polymer, the plasticity and the rate of shear. The limit to which degradation proceeds, i.e. the molecular weight obtained on prolonged mastication, is dependent only upon the plasticity and is independent of the initial molecular weight, i.e. polymers below the limiting value are not degraded by mastication processes (R. J. Ceresa, Block and Graft Copolymers, Butterworths, 1962, pp. 72–73). For example, the experimental limiting molecular weight is 70,000 in the mastication of rubber at room temperature (R. J. Ceresa, ibid., p. 69). It has been considered that when low molecular weight polymers, i.e., polymers having a molecular weight and viscosity below the minimum required for chain rupture are blended with polymers having a molecular weight and viscosity above the minimum required for chain rupture graft copolymerization does not occur. It was believed, therefore, that both polymers being blended must undergo chain scission to effect grafting. Thus, in order to graft carboxyl group-containing polymers onto mono- or diolefin polymer chains it was believed necessary in all cases to use, as the grafting polymer, a polymer having a sufficiently high molecular weight and viscosity that it would undergo chain rupturing upon being subjected to shearing forces. This is unsatisfactory where it is desired to introduce carboxyl groups into the polymer to improve the solubility properties, receptivity to dyes, adhesive properties, etc. of the polymers without significantly modifying the basic characteristics and physical strength properties of the monoolefin or diolefin polymer. The molecular weight of the carboxyl group-containing polymer would be so high that considerably large quantities of carboxyl group-containing polymer would have to be grafted onto the mono- or diolefin polymer in order to incorporate a sufficient amount of carboxyl groups into the mono- or diolefin polymer to get the desired effect, with the consequence that the other properties of the backbone polymer would be significantly altered.

It has long been desired to incorporate carboxyl functionality into mono- or diolefin polymers by mechanical means without significantly altering the properties of the polymer.

SUMMARY OF THE INVENTION

A method has now been discovered which eliminates the above difficulty. Accordingly, it is an object of the present invention to provide a new and novel process for the preparation of carboxyl-containing polymers. It is another object of the invention to react a copolymer of a carboxyl group-containing monomer and an ethylenically unsaturated monomer copolymerizable therwith an olefin polymers and thereby obtain modified olefin polymers containing carboxyl groups. It is another object of this invention to compatibilize a material containing hydroxyl groups, such as silica, clay, glass, cellulose, metal, etc. with a polymer which is free of functionality capable of reacting therewith. It is another object of this invention to provide composites of such materials which have improved properties. It is another object of this invention to provide an improved method for incorporating fillers or reinforcing materials into polymers. These and other objects of the invention will become obvious from the description of the invention presented hereinafter.

In accordance with the present invention a low molecular weight thermoplastic copolymer of a carboxyl-containing monomer and an ethylenically unsaturated monomer copolymerizable therwith is grafted onto a mono- or diolefin homopolymer or copolymer by subjecting the polymeric mixture to shearing forces at a temperature above the softening point of both the low molecular weight thermoplastic copolymer and the mono- or diolefin homopolymer or copolymer. The preferred low molecular weight thermoplastic copolymers are those of styrene and maleic acid of maleic anhydride and styrene and acrylic acid. The preferred backbone polymers are the monoolefinic polymers such as polyethylene and polypropylene. The invention also includes a process for compatibilizing a mono- or diolefin polymer with a hydroxyl-containing filler material by subjecting a mixture of the filler material, the mono- or diolefin polymer, and a low molecular weight thermoplastic copolymer of a carboxylic acid monomer and an ethylenically unsaturated monomer copolymerizable therewith to shearing forces at a temperature above the softening point of both the low molecular weight carboxyl-containing copolymer and the mono- or diolefin polymer.

DESCRIPTION OF THE INVENTION

The monoolefin polymers which provide sites for the formation of free radicals as a result of shear include monoolefin homopolymers such as polyethylene, polypropylene, poly-1-butene, polyisobutylene, etc., monoolefin copolymers with diolefin or other monoolefin comonomers such as poly(ethylene-co-propylene), poly (ethylene-co-1-hexene), poly(ethylene-co-propylene-co-1,4-hexadiene), poly(ethylene-co-propylene-co-ethylidenenorbornene), poly(isobutylene-co-isoprene), etc., and olefin copolymers with polar monomers such as poly (ethylene-co-vinyl acetate), etc.

The diolefin polymers which are effective in the practice of this invention include homopolymers and copolymers of conjugated dienes including homopolymers of butadiene and substituted butadienes such as isoprene, 1,3-pentadiene, 2-chlorobutadiene, etc. and copolymers of these with other ethylenically unsaturated monomeric materials such as styrene, acrylonitrile, etc.

The monoolefin and diolefin polymers usable in the invention have a minimum number average molecular weight of about 10,000.

The low molecular weight carboxyl-containing thermoplastic copolymers contain an unsaturated carboxylic acid component which may be a monofunctional acid such as acrylic acid, methacrylic acid, or crotonic acid, or a difunctional carboxylic acid such as maleic acid, itaconic acid or citraconic acid or the anhydrides of these acids. Although other monofunctional or difunctional unsaturated carboxylic acids may be used those listed are the preferred carboxylic acids for use as the carboxyl group containing comonomer. In the most preferred embodiments of the invention maleic acid, maleic anhydride, or acrylic acid is used as the carboxylic acid component of the low molecular weight copolymer. The ethylenically unsaturated monomer copolymerizable with the carboxyl-containing monomer may be an alpha-olefin such as ethylene, propylene or i-butylene, etc.; an aromatic olefin such as sytrene, vinyl toluene, etc.; diene such as butadiene or substituted butadienes, etc.; an acrylic or methacrylic ester, such as ethyl acrylate, butyl acrylate, methyl methacrylate, etc. The preferred comonomers used will depend, in general, on which carboxylic monomer is employed. Styrene is the preferred comonomer when acrylic acid or maleic acid or anhydride is used as the carboxyl component.

The method of copolymerization of the low molecular weight copolymer components is well known in the art and needs no further description. The preparation of styrene-maleic anhydride copolymers is described in U.S. Pat. Nos. 2,286,062; 2,430,313; 2,675,370 and 3,085,994.

The molar ratio of carboxylic acid component to the copolymerizable monomer in the low molecular weight thermoplastic copolymer is such that there will be at least one carboxyl group per molecule. The preferred ratio will vary depending on the monomers used and the properties desired in the final product. In the case of styrene-maleic acid (or maleic anhydride) or styreneacrylic acid copolymers the preferred molar ratio of styrene to maleic acid, maleic anhydride or acrylic acid is about 1:4 to 1, i.e. 1 to 4 moles of styrene per each mole of maleic acid, maleic anhydride or acrylic acid. The number average molecular weight of the low molelcular weight thermoplastic copolymer is generally in the range of about 500 to 5000 and preferably about 500 to 4000.

It has been observed that beneficial results are realized when the low molecular weight carboxyl-containing copolymer is added at concentrations as low as 0.1 percent, based on the total weight of mono- or diolefin polymer and carboxyl-containing copolymer. In general, the amounts of these two polymer components are often in the range of about 75 to 99.9% of the mono- or diolefin polymer and from about 0.1 to 25% of the low molecular weight thermoplastic carboxyl-containing copolymer based on the total weight of these polymers. A particularly suitable composition contains about 99.5 to 90% of the mono- or diolefin polymer and about 0.5 to 10% of the low molecular weight thermoplastic carboxyl-containing copolymer, based on the toal weight of these two polymer components.

The reactants may be premixed at ambient temperature and then added to a preheated mechanical mixing device capable of subjecting the mixture to high shear forces. Alternatively, the low molecular weight thermoplastic carboxyl-containing copolymer may be added to the mono- or diolefin polymer which is undergoing mixing.

The blending operation, during which the grafting reaction occurs, is carried out at a temperature above the softening point of both the mono- or diolefin polymer and the low molecular weight thermoplastic carboxyl-containing copolymer. This ranges from a temperature of about room temperature, i.e. about 20°C, for the case in which the mono- or diolefin polymer is elastomeric and the carboxyl-containing copolymer is liquid or semi-liquid, up to about 250°C or more for the case in which one or both polymers are crystalline. In general it is preferred not to exceed temperatures at which degradation of the polymer composition occurs although the composition can generally be subjected to such high temperatures for short periods of time without adverse effect. The temperature of the reaction mixture is preferably maintained within the range of about 100° to 200°C during the blending operation.

The polymeric mixture may be free of stabilizers or may contain stabilizers or may contain antioxidants and other stabilizers generally used therewith.

The presence of a free radical precursor which undergoes thermal decomposition to generate free radicals at the reaction temperature does not significantly increase the extent of the reaction between the mono- or diolefin polymer and the low molecular weight thermoplastic carboxyl-containing copolymer.

The specific examples presented hereinafter illustrate the invention in greater detail but it is in no way intended to limit the invention or the claims. In the examples, all parts and percentages are on a weight basis unless otherwise stated.

EXAMPLE 1

Stabilized polypropylene (density 0.905, melt flow 4 g./10 min. at 230°C.) is mixed in a Brabender Plasticorder for 10 min. at 60 or 117 rpm at 175° or 200°C. The polymer is then pressed into a film at 375°F. and ground to a 20 mesh powder on a cutting mill. The powder is then extracted with acetone at room temperature for 24 hours to obtain the acetone-soluble and acetone-insoluble fractions.

Unstabilized polypropylene (density 0.904, melt flow 4 g./10 min. at 230°C.) is subjected to similar treatment.

A styrene-maleic anhydride copolymer (2:1 mole ratio, number average molecular weight 1500) is similarly treated in the Brabender Plasticorder, ground to a 20 mesh powder and extracted with acetone at room temperature for 24 hours.

The details of the individual experiments and the results thereof are shown in Table I.

TABLE I

| PP % | SMA % | Temp. °C. | Blade Speed rpm | Acetone Extraction Sol. % | Acetone Extraction Insol. % |
|---|---|---|---|---|---|
| 100S* | 0 | 175 | 60 | 0.2 | 99.8 |
| 100S | 0 | 175 | 117 | 0.3 | 99.7 |
| 100S | 0 | 200 | 60 | 0.1 | 99.9 |
| 100S | 0 | 200 | 117 | 0.1 | 99.9 |
| 100U** | 0 | 175 | 60 | 0.4 | 99.6 |
| 0 | 100 | 175 | 60 | 100.0 | 0.0 |
| 0 | 100 | 200 | 117 | 100.0 | 0.0 |

*S indicates stabilized polypropylene.
**U indicates unstabilized polypropylene.

A dry blend of 90 parts of stabilized polypropylene powder and 10 parts of styrene-maleic anhydride (2:1) copolymer powder having a number average molecular weight of 1500 is prepared at room temperature and subjected to extraction with acetone. The copolymer is quantitatively extracted from the mixture.

EXAMPLES 2–5

The Brabender Plasticorder is heated to 175° or 200°C. and the mixing blade speed is adjusted to 60 or 117 rpm. A total of 49.0 g. of stabilized polypropylene is added in three portions to the mixing chamber and fluxed for 5 minutes. After 1.0 go 2:1 styrene-maleic anhydride copolymer having a number average molelcular weight of 1500 is added, the mixture is mixed for 10 minutes. The reaction mixture is removed from the chamber and molded to a thin sheet at 370°F. The molded sheet is ground to a 20 mesh powder. A 5.0 g. sample of the powder is extracted with 100 ml. of distilled reagent acetone at room temperature. The acetone-insoluble material and the residue obtained on evaporation of the acetone extract are dried in vacuo for 24 hours.

The results are shown in Table II. The amount of acetone-soluble product obtained with polypropylene alone, as shown in Table I, is subtracted from the amounts obtained from the various reaction mixtures, to give the amounts of unreacted styrene-maleic anhydride copolymer. The calculated amount of reacted copolymer is in good agreement with that obtained as the acetone-insoluble fraction.

EXAMPLES 6–9

The procedure of Examples 2–5 is repeated substituting a 3:1 styrene-maleic anhydride copolymer, molecular weight 2000, for the 2:1 copolymer.

EXAMPLES 10–17

The procedure of Examples 2–5 is repeated using 47.5 g. of stabilized polypropylene and 2.5 g. of the 2:1 (runs 10–13) or 3:1 (runs 14–17) styrene-maleic anhydride copolymer.

EXAMPLES 18–21

The procedure of Examples 2–5 is repeated using 45.0 g. of stabilized polypropylene and 5.0 g. of 2:1 styrene-maleic anhydride copolymer having a number average molecular weight of 1500.

TABLE II

| Ex. No. | Charge PP % | Charge SMA % | Temp. °C. | Blade Speed rpm | SMA Recovered % | SMA Reacted % | SMA Product % |
|---|---|---|---|---|---|---|---|
| 2 | 98 | 2 | 175 | 60 | 47.0 | 53.0 | 1.07 |

TABLE II-continued

| Ex. No. | PP % | Charge SMA % | Temp. °C. | Blade Speed rpm | SMA Recovered % | SMA Reacted % | SMA Product % |
|---|---|---|---|---|---|---|---|
| 3 | 98 | 2 | 175 | 117 | 18.3 | 81.7 | 1.64 |
| 4 | 98 | 2 | 200 | 60 | 17.9 | 82.1 | 1.65 |
| 5 | 98 | 2 | 200 | 117 | 8.8 | 91.2 | 1.83 |
| 6 | 98 | 2 | 175 | 60 | 37.7 | 62.3 | 1.25 |
| 7 | 98 | 2 | 175 | 117 | 12.2 | 87.8 | 1.76 |
| 8 | 98 | 2 | 200 | 60 | 9.8 | 90.2 | 1.81 |
| 9 | 98 | 2 | 200 | 117 | 11.5 | 88.5 | 1.78 |
| 10 | 95 | 5 | 175 | 60 | 24.6 | 75.4 | 3.8 |
| 11 | 95 | 5 | 175 | 117 | 20.9 | 79.1 | 4.0 |
| 12 | 95 | 5 | 200 | 60 | 18.0 | 82.0 | 4.1 |
| 13 | 95 | 5 | 200 | 117 | 14.5 | 85.5 | 4.3 |
| 14 | 95 | 5 | 175 | 60 | 17.0 | 83.0 | 4.2 |
| 15 | 95 | 5 | 175 | 117 | 13.0 | 87.0 | 4.4 |
| 16 | 95 | 5 | 200 | 60 | 4.4 | 95.6 | 4.8 |
| 17 | 95 | 5 | 200 | 117 | 10.8 | 89.2 | 4.5 |
| 18 | 90 | 10 | 175 | 60 | 40.6 | 59.4 | 6.2 |
| 19 | 90 | 10 | 175 | 117 | 35.2 | 64.8 | 6.7 |
| 20 | 90 | 10 | 200 | 60 | 36.9 | 63.1 | 6.6 |
| 21 | 90 | 10 | 200 | 117 | 30.5 | 69.5 | 7.2 |

EXAMPLE 22

The procedure of Example 18 is repeated using 45.0 g. of unstabilized polypropylene and 5.0 g. of the 2:1 styrene-maleic anhydride copolymer. The Brabender Plasticorder is operated at 60 rpm at 175°C. After a 10 minute mixing period, 3.0% of unreacted styrene-maleic anhydride copolymer is recovered. The 97.0% of reacted copolymer represents 9.7% of styrene-maleic anhydride copolymer in the reaction product.

EXAMPLE 23

The procedure of Example 19 is repeated using 45.0 g. of stabilized polypropylene and 5.0 g. of the 2:1 styrene-maleic anhydride copolymer. After 0.90 g. of dicumyl peroxide is added the mixture is mixed in the Brabender Plasticorder at 117 rpm at 175°C. for 10 minutes. Acetone extraction indicates a recovery of 29.8% of unreacted copolymer. The 70.2% of reacted copolymer represents 7.29% of styrene-maleic anhydride copolymer in the reaction product.

EXAMPLE 24

The Brabender Plasticorder is heated to 165°C. and the mixing blade speed is adjusted to 60 rpm. After 45.0 g. of low density polyethylene is fluxed in the mixing chamber for 5 minutes, 5.0 g. of 2:1 styrene-maleic anhydride copolymer having a number average molecular weight of 1500 is added and the mixture is mixed for 10 minutes. Acetone extraction of the powdered reaction product results in the recovery of 70.0% of the original styrene-maleic anhydride copolymer. The reaction product contains 3.2% of reacted maleic anhydride copolymer.

EXAMPLE 25

The procedure of Example 24 is repeated at 165°C. with the mixing blade speed adjusted to 117 rpm. A charge of 45.0 g. of low density polyethylene and 5.0 g. of the 2:1 styrene-maleic anhydride copolymer is fluxed in the mixing chamber for 10 minutes. Acetone extraction of the reaction mixture results in the recovery of 76.9% of unreacted styrene-maleic anhydride copolymer. The extracted reaction product contains 2.5% of reacted styrene-maleic anhydride copolymer.

Examples 1–25 illustrate the preparation of copolymers of a monoolefin and a carboxyl-containing copolymer.

The carboxyl-containing polymers prepared by the process of the present invention may be fabricated into shaped objects by conventional fabrication methods. The carboxyl-containing polymers may be melt extruded into films, sheets, tubes, fibers, profiles and other shapes. The films or sheets can be readily printed or decorated, laminated to rigid or flexible substrates such as wood, paper, metals, thermoset polymers, other thermoplastic films, rubber sheeting, etc., used as adhesive films between plies in a multiple composite, e.g., wood-wood, wood-metal, metal-metal, as well as thermoplastic or thermoset polymer composites with wood, metal, glass, woven or non-woven fabrics or mats, paper, etc., pressure or vacuum-formed, stretched, oriented, heat-shrunk, vacuum metallized, coated with heat-sealable and/or barrier coating compositions. The presence of carboxyl groups in the polymer film in most cases will make it unnecessary to treat the film surface, e.g., by electrical discharge or flame, or apply an adhesive coating to promote adhesion.

The carboxyl-containing polymers may also be converted into films or sheets by calendering and flatbed pressing. The incorporation of blowing agents permits the production of foamed film or sheeting.

The fibers produced from the carboxyl-containing polymers by melt spinning or film splitting may be converted into woven and non-woven structures. Due to the presence of carboxyl groups the non-woven webs or mats have greater strength than the webs or mats produced from the unmodified polymers and in many cases, e.g., carboxyl-containing polyolefins such as polyethylene or polypropylene, have paper-like characteristics. Both woven and non-woven structures may be coated or printed with conventional paper or textile coating and printing compositions to yield coated structures with good coating-substrate adhesion.

The carboxyl-containing fibers per se or in the form of woven or non-woven structures are readily dyed with basic dyes, metal-containing dyes and "reactive" dyes. The dyes may be incorporated in the polymer melt before spinning or extrusion.

The dyed or natural fiber mats or woven shapes may be laminated to substrates such as metals, wood, natural or synthetic fiber or film structures, etc. and yield composites with good interfacial adhesion.

The presence of carboxyl groups in the carboxyl-containing polymers increases the adhesion and compatibility with inorganic or organic fillers such as silicates (clay, talc, mica, asbestos, wollastonite), oxides (aluminum oxide, hydrated alumina, magnesium oxide, titanium dioxide, zinc oxide, quartz, diatomaceous earth), carbonates (calcium, barium and magnesium carbonates), hydroxides, carbon black, graphite, metal powders as well as glass in the form of powder, fibers or flake, lignin, keratin, wood flour, cotton flock, and nylon, acrylic, alpha cellulose and rayon fibers. The fillers are generally blended with the carboxyl-containing polymers prior to extrusion into films or fibers.

Filled or unfilled carboxyl-containing polymers may be extrusion laminated onto suitable substrates such as wood, paper, metals, as well as structures prepared from thermoplastic or thermosetting resins.

The carboxyl-containing polymers per se or blended with dyes, pigments or fillers may be compressed or injection molded into shaped objects.

The carboxyl-containing polymers may be crosslinked by treatment with suitable polyvalent metal compounds, e.g. zinc acetate, basic aluminum acetate, zirconium acetyl acetonate. The cross-linking reaction is carried out by treating the film, fiber or shaped object prepared from the carboxyl-containing polymer with as aqueous or organic solution of the metal compound. The carboxyl-containing polymer may also be compounded with metal oxides such as zinc oxide, magnesium oxide or lead oxide and extruded or molded into crosslinked shaped objects.

Treatment of the carboxyl-containing polymers with monovalent compounds such as sodium hydroxide, potassium hydroxide or lithium hydroxide may be carried out by contacting the polymer with the solid inorganic compound or with an aqueous solution thereof. The resulting salt form of the carboxyl-containing polymer has increased strength as well as modified properties, e.g. increased water vapor permeability. The salt form can be extruded or molded into shaped objects.

Treatment of the carboxyl-containing polymer with a monovalent metal hydroxide, e.g. sodium hydroxide or ammonium hydroxide, or with an organic amine such as triethylamine or ethanolamine increases the water dispersibility. Aqueous dispersions prepared therefrom may be coated on substrates such as paper, wood, or metal as well as fibers and, after drying, yield coated substrates with strongly adherent coatings.

The carboxyl-containing polymers may be converted into fine powders and used in the fluid bed coating of heated substrates, e.g. metal objects, to give adherent coatings. The powdered carboxyl-containing polymers may also be readily dispersed in aqueous amine or inorganic base solutions.

The carboxyl-containing polymers are polyanionic in nature and may be combined with polycationic polymers to yield polyelectrolyte complexes. The latter are insoluble in water but are solubilized in simple electrolyte solutions, e.g. lithium chloride. In this form they may be converted into membranes which are useful in dialysis and selective filtration.

In a most useful version of the present invention, the carboxylation of the mono- or diolefin polymer with the low molecular weight thermoplastic carboxyl-containing copolymer may be carried out in an extruder and converted directly into a shaped object such as an injection molded shape or an extruded film or fiber. In this manner a fiber or film containing carboxyl groups may be prepared directly from an untreated polymer by conducting the carboxylation reaction in the extruder barrel.

In a one step embodiment of the present invention, a mixture of the mono- or diolefin polymer, the low molecular weight carboxyl-containing copolymer and an organic or inorganic hydroxyl-containing material is subjected to shear in a suitable mixing device to yield a composite in which the adhesion between the substrate polymer and the hydroxyl-containing material is markedly improved. The substrate polymer is bonded to the surface of the hydroxyl-containing filler or reinforcing agent, forming a coating thereon. The polymer-coated filler or reinforcing agent may then be blended and compatibilized with additional polymer, in various proportions. When the filler represents a substantial percentage of the polymercoated filler composition, it serves as a concentrate which may be blended with unfilled polymer to reduce the filler content to a desired lower level. For example, a polymercoated filler composition containing 70–95 weight-% of filler can be used in the preparation of a composite containing 10–60% filler.

The polymer used in the preparation of the concentrate and in the final composite may be identical in composition or may be of the same chemical type but of different properties. Thus, a stabilized polypropylene may be used in the preparation of both concentrate and final composite. Alternatively, an unstabilized polypropylene may be used in the concentrate and a stabilized polypropylene may be used in the composite preparation. In another variation, a high melt flow polymer may be used in the preparation of the concentrate and a low melt flow polymer may be used in the preparation of the composite from that concentrate.

The following examples illustrate this version of the present invention but are in no way intended to limit the obvious variations thereof.

EXAMPLES 26–31

A dry blend of 45.0 g. of clay, 5.0 g. of unstabilized polypropylene (PP), 0.5 g. of 2:1 styrenemaleic anhydride copolymer having a number average molecular weight of 1500 (SMA) is mixed in a glass jar on a roller for 15 minutes. The Brabender Plasticorder is heated to 175°–180°C. and the shaft speed is set at 60 rpm. The 90/10/1 clay/PP/SMA dry blend is added as rapidly as possible to the mixing chamber, fluxed for 5 minutes, mixed for 10 minutes, and then discharged. The resultant concentrate is a free flowing powder.

After 44.4 g. of stabilized polypropylene is fluxed in the Brabender Plasticorder at 175°C. at 60 rpm for 5 minutes, 5.6 g. of the 90/10/1 clay/PP/SMA concentrate containing 5.0 g. of clay is added and mixed for 10 minutes. The resultant composite has a 90/10/0.1 PP/clay/SMA composition.

A 70/30/0.2 PP/clay/SMA composite is prepared in the same manner from 33.3 g. of stabilized polypropylene and 16.7 g. of the 90/10/1 clay/PP/SMA concentrate.

A 50/50/0.3 PP/clay/SMA composite is prepared in the same manner from 22.2 g. stabilized polypropylene and 27.8 g. of the 90/10/1 clay/PP/SMA concentrate.

For comparison purposes, 90/10, 70/30 and 50/50 PP/clay composites are prepared in the same manner from SMA-free 90/10 clay/PP concentrates.

The tensile strength of the composites is determined according to ASTM D882-64T and the tangent flexural modulus is determined according to ASTM D790-66. The results shown in Table III indicate that the practice of this invention results in a retention of the tensile strength and an increase in the elongation and flexural moduli of the composites prepared from the 90/10 clay/PP concentrates.

EXAMPLES 32–37

The procedure of Examples 26–31 is repeated using 15.0 g. of unstabilized polypropylene, 35.0 g. of clay and 1.5 g. of 2:1 styrene-maleic anhydride copolymer having a number average molecular weight of 1500 in the preparation of a 70/30/3 clay/PP/SMA concentrate which is a tough, horny mass.

A 90/10/0.2 PP/clay/SMA composite is prepared using 42.8 g. of stabilized polypropylene and 7.2 g. of the 70/30/3 clay/PP/SMA concentrate.

A 70/30/0.6 PP/clay/SMA composite is prepared using 28.5 g. of stabilized polypropylene and 21.5 g. of the 70/30/3 clay/PP/SMA concentrate.

A 50/50/1.1 PP/clay/SMA composite is prepared using 14.3 g. of stabilized polypropylene and 35.7 g. of the 70/30/3 clay/PP/SMA concentrate.

For comparison purposes, 90/10, 70/30 and 50/50 PP/clay composites are prepared in the same manner from SMA-free 70/30 PP/clay concentrates.

The modification of the polypropylene with the styrene-maleic anhydride oligomer in accordance with the process of this invention, results in an increase in the tensile strength and elongation of the composites prepared from the 70/30 clay/PP concentrates. The 70/30 PP/clay composites also show an increase in the flexural modulus.

TABLE III

| Example No. | Concentrate Clay/PP/SMA | Composite PP/Clay/SMA | Tensile Strength psi Yield | Tensile Strength psi Break | Elongation % | Flexural Modulus psi |
|---|---|---|---|---|---|---|
| 26 | 90/10/0 | 90/10/0 | 4000 | 4000 | 2.0 | 210,000 |
| 27 | 90/10/1 | 90/10/0.1 | 3740 | 3500 | 6.7 | 355,000 |
| 28 | 90/10/0 | 70/30/0 | 3700 | 3600 | <1.0 | 290,000 |
| 29 | 90/10/1 | 70/30/0.2 | 3800 | 3600 | 2.0 | 410,000 |
| 30 | 90/10/0 | 50/50/0 | 3200 | 3200 | <1.0 | 490,000 |
| 31 | 90/10/1 | 50/50/0.3 | 3200 | 3000 | 1.5 | 520,000 |
| 32 | 70/30/0 | 90/10/0 | 3700 | 3700 | <1.0 | 203,000 |
| 33 | 70/30/3 | 90/10/0.2 | 3900 | 3400 | 9.1 | 190,000 |
| 34 | 70/30/0 | 70/30/0 | 2900 | 2900 | <1.0 | 201,000 |
| 35 | 70/30/3 | 70/30/0.6 | 3490 | 3400 | 2.5 | 405,000 |
| 36 | 70/30/0 | 50/50/0 | 2500 | 2800 | <1.0 | 420,000 |
| 37 | 70/30/3 | 50/50/1.1 | 3450 | 3450 | 1.0 | 320,000 |

The specific effect of the low molecular weight styrene-maleic anhydride copolymer is shown by comparing the results obtained therewith with those obtained substituting stearic acid for the copolymer.

EXAMPLES 38–40

The procedure of Examples 26–31 is repeated substituting the same weights of stearic acid for the styrene-maleic anhydride copolymer. The results shown in Table IV demonstrate that while modification of the polypropylene with the styrene-maleic anhydride copolymer enhances the reinforcing action of the filler, the presence of stearic acid (SA) results in a severe loss in the reinforcing action.

TABLE IV

| Ex. No. | Concentrate Clay/PP/Modifier | Composite PP/Clay/Modifier | Flexural Modulus psi |
|---|---|---|---|
| 26 | 90/10/0 | 90/10/0 | 210,000 |
| 27 | 90/10/1 SMA | 90/10/0.1 SMA | 355,000 |
| 38 | 90/10/1 SA | 90/10/0.1 SA | 92,000 |
| 28 | 90/10/0 | 70/30/0 | 290,000 |
| 29 | 90/10/1 SMA | 70/30/0.2 SMA | 410,000 |
| 39 | 90/10/1 SA | 70/30/0.2 SA | 137,000 |
| 30 | 90/10/0 | 50/50/0 | 490,000 |
| 31 | 90/10/1 SMA | 50/50/0.3 SMA | 520,000 |
| 40 | 90/10/1 SA | 50/50/0.3 SA | 248,000 |

EXAMPLES 41–44

A dry blend of 5.0 g. of unstabilized polypropylene and 45.0 g. of clay is heated for 5 minutes in the Brabender Plasticorder at 175°C. at 60 rpm. Then 0.5 g. of 2:1 styrene-maleic anhydride copolymer having a number average molecular weight of 1500 is added and the mixture heated for an additional 10 minutes. The 90/10/1 clay/PP/SMA concentrate is used in the preparation of 90/10/0.1 and 70/30/0.2 PP/clay/SMA composites using the process and quantities in Examples 27 and 29.

A dry blend of 15.0 g. of unstabilized polypropylene and 35.0 g. of clay is heated in the Plasticorder for 5 minutes at 175°C. at 60 rpm. Then 1.5 g. of 2:1 styrene-maleic anhydride oligomer is added and the mixture heated for 10 minutes. The 70/30/3 clay/PP/SMA concentrate is used in the preparation of 90/10/0.2 and 70/30/0.6 PP/clay/SMA composites using the quantities and process in Examples 33 and 35. Table IV indicates that the two-step procedure (B) involving the addition of the oligomer to the preheated mixture of polypropylene and clay yields even higher flexural moduli and elongation than the one-step procedure (A) involving heating and shearing of the polypropylene-clay-oligomer mixture.

TABLE V

| Ex. No. | Concentrate Clay/PP/SMA | Procedure | Composite PP/Clay/SMA | Tensile Strength psi | Elongation % | Flexural Modulus psi |
|---|---|---|---|---|---|---|
| 27 | 90/10/1 | A | 90/10/0.1 | 3500 | 6.7 | 355,000 |
| 41 |  | B |  | 4200 | 66 | 369,000 |
| 29 | 90/10/1 | A | 70/30/0.2 | 3600 | 2.0 | 410,000 |
| 42 |  | B |  | 3600 | 37 | 439,000 |
| 33 | 70/30/3 | A | 90/10/0.2 | 3400 | 9.1 | 190,000 |
| 43 |  | B |  | 4000 | 78 | 339,000 |
| 35 | 70/30/3 | A | 70/30/0.6 | 3400 | 2.5 | 405,000 |
| 44 |  | B |  | 3000 | 27 | 467,000 |

EXAMPLES 45–50

The procedure of Examples 26–31 is repeated substituting one-fourth inch chopped strand fiberglass for the clay in the preparation of a 90/10/1 glass/PP/SMA concentrate. The concentrate is used in the preparation of 90/10/0.1, 70/30/0.2 and 50/50/0.3 PP/glass/SMA composites. An SMA-free 90/10 glass/PP concentrate is similarly prepared and used in the preparation of 90/10, 70/30 and 50/50 PP/glass composites. As shown in Table VI, (runs 45–50) the use of styrene-maleic anhydride reacted polypropylene results in higher tensile strengths and/or flexural moduli than obtained with the use of SMA-free polypropylene.

EXAMPLES 51–56

The procedure of Examples 32–37 is repeated substituting one-fourth inch chopped strand fiberglass for the clay in the preparation of a 70/30/3 glass/PP/SMA concentrate. The concentrate is used in the preparation of 90/10/0.2, 70/30/0.6 and 50/50/1.1 PP/glass/SMA composites. An SMA-free 70/30 glass/PP concentrate is similarly prepared and used in the preparation of 90/10, 70/30 and 50/50 PP/glass composites. Table VI (runs 51–56) indicate that improved properties are obtained when the composite is prepared with polypropylene which has been reacted with the styrene-maleic anhydride copolymer.

TABLE VI

| Ex. No. | Concentrate Glass/PP/SMA | Composite PP/Glass/SMA | Tensile Strength psi | Flexural Modulus psi |
|---|---|---|---|---|
| 45 | 90/10/0 | 90/10/0 | 3700 | 306,000 |
| 46 | 90/10/1 | 90/10/0.1 | 3800 | 350,000 |
| 47 | 90/10/0 | 70/30/0 | 1800 | 304,000 |
| 48 | 90/10/1 | 70/30/0.2 | 2400 | 370,000 |
| 49 | 90/10/0 | 50/50/0 | 2400 | 495,000 |
| 50 | 90/10/1 | 50/50/0.3 | 2100 | 559,000 |
| 51 | 70/30/0 | 90/10/0 | 4000 | 322,000 |
| 52 | 70/30/3 | 90/10/0.2 | 4400 | 405,000 |
| 53 | 70/30/0 | 70/30/0 | 2800 | 523,000 |
| 54 | 70/30/3 | 70/30/0.6 | 3500 | 545,000 |
| 55 | 70/30/0 | 50/50/0 | 820 | 561,000 |
| 56 | 70/30/3 | 50/50/1.1 | 1900 | 690,000 |

Examples 26–56 illustrate the improved physical properties obtained in a filled olefin polymer prepared in accordance with the present invention.

EXAMPLES 57–60

The procedure of Examples 2–5 is repeated using 45.0 g. of stabilized polypropylene and 5.0 g. of 2:1 styreneacrylic acid copolymer (SAA) having a number average molecular weight of 1400. The results are summarized in Table VII.

TABLE VII

| Ex. No. | Temp. °C | Blade Speed rpm | SAA Recovered % | SAA Reacted % | SAA in Product % |
|---|---|---|---|---|---|
| 57 | 175 | 60 | 13.5 | 86.5 | 8.8 |
| 58 | 175 | 117 | 14.6 | 85.4 | 8.7 |
| 59 | 200 | 60 | 10.4 | 89.6 | 9.1 |
| 60 | 200 | 117 | 6.6 | 93.4 | 9.4 |

EXAMPLE 61

The procedure of Example 24 is repeated using 45.0 g. low density polyethylene and 5.0 g. of a 2:1 styrene-acrylic acid copolymer having a number average molecular weight of 1400. Acetone extraction of the powdered reaction product results in the recovery of 15.9% of the original SAA copolymer. The extracted product contains 8.5% reacted SAA copolymer.

EXAMPLES 62–67

The procedure of Examples 32–37 is repeated except that a 2:1 styrene-acrylic acid copolymer (SAA) having a number average molecular weight of 1400 is substituted for the 2:1 sytrene-maleic anhydride copolymer. The results shown in Table VIII indicate that the use of the SAA copolymer results in increases in tensile strength and in flexural modulus. In the cases of 90/10 and 70/30 PP/clay composites, an increase in elongation is observed.

Examples 57–67 illustrate the invention when styrene-acrylic acid copolymer is used as the low molecular weight thermoplastic carboxyl-containing copolymer.

EXAMPLE 68

The procedure of Example 2 is repeated except that elastomeric polybutadiene having a number average molecular weight of 100,000 is substituted for the polypropylene. The final product will show styrene-maleic anhydride copolymer chemically attached to the polybutadiene.

TABLE VIII

| Example | Concentrate Clay/PP/SAA | Composite PP/Clay/SAA | Tensile Strength, psi Yield (a) | Tensile Strength, psi Break | Elongation % | Flexural Modulus psi |
|---|---|---|---|---|---|---|
| 62 | 70/30/0 | 90/10/9 | — | 3220 | 3.5 | 238,000 |
| 63 | 70/30/3 | 90/10/0.2 | 4790 | 4670 | 8.9 | 285,000 |
| 64 | 70/30/0 | 70/30/0 | — | 3180 | 2.7 | 340,000 |
| 65 | 70/30/3 | 70/30/0.6 | — | 4370 | 4.3 | 381,000 |
| 66 | 70/30/0 | 50/50/0 | — | 3030 | 2.1 | 440,000 |
| 67 | 70/30/3 | 50/50/1.1 | — | 3890 | 2.1 | 592,000 |

(a) No yield.

EXAMPLE 69

The procedure of Example 68 is repeated except that thermoplastic butadiene-styrene copolymer having a number average molecular weight of 150,000 and 25% (on a molar basis) styrene is substituted for the polybutadiene. The resulting product will show styrene-maleic anhydride copolymer chemically attached to the butadiene-styrene copolymer.

Although the invention is described with particular reference to specific working examples, the scope of the invention is not limited thereto but is defined by the breadth of the appended claims.

What is claimed is:

1. A process for preparing a carboxyl-containing polymer which comprises subjecting a mixture of a mono- or diolefin polymer having a number average molecular weight of at least about 10,000 and a thermoplastic copolymer of a carboxyl-containing monomer and a monomer copolymerizable therewith, the molar ratio of carboxylic acid component to copolymerizable monomer being such that there will be at least one carboxyl group present for each molecule of copolymer present in the mixture, said copolymer having a number average molecular weight of about 500 to 5000 and being present at a concentration of about 0.1 to 25%, based on the total weight of mono- or diolefin polymer and carboxyl-containing copolymer, to shearing forces at a temperature above the softening point of both the mono- or diolefin polymer and the carboxyl-containing copolymer.

2. A process according to claim 1 wherein said olefin homopolymer is polypropylene.

3. A process according to claim 1 wherein said olefin homopolymer is polyethylene.

4. The process of claim 1 wherein the temperature of the mixture is maintained at about 20° to 250°C during the reaction.

5. A process according to claim 1 wherein the carboxyl-containing copolymer is selected from the group consisting of styrene-maleic acid copolymer, styrene-maleic anhydride copolymer and styrene-acrylic acid copolymer and has a styrene:carboxyl component molar ratio of about 1:1 to 4:1.

6. The process of claim 5 wherein the temperature of the mixture is maintained at about 100° to 200°C during the reaction.

7. The process of claim 5 wherein the carboxyl-containing copolymer is present at a concentration of about 0.5 to 10%, based on the total weight of mono- or diolefin polymer and carboxyl-containing copolymer.

8. A process according to claim 5 wherein said low molecular weight thermoplastic carboxyl-containing copolymer has a number average molecular weight of about 500 to 4000.

9. A process for preparing a compatibilized filled polymer composition comprising encapsulating hydroxyl group-containing filler material with a coating of a copolymer comprised of a first polymer component selected from the group consisting of alpha-olefin, aromatic olefin, and diene homopolymer or copolymer having a number average molecular weight of at least about 10,000 and a second polymer comprised of a thermoplastic copolymer of a carboxyl group-containing monomer and another ethylenically unsaturated monomer copolymerizable therewith and being substantially free of carboxyl groups, the molar ratio of carboxyl-containing monomer to copolymerizable monomer being such that there will be at least one carboxyl group present for each molecule of said second polymer present in the composition, said second polymer containing about 0.1 to 25% of said thermoplastic copolymer, based on the total weight of the second polymer and having a number average molecular weight of about 500 to 5000, by subjecting the mixture to shearing forces above the softening point of both the first and second polymers.

10. A process according to claim 9 wherein said first polymer is polypropylene.

11. The process of claim 9 wherein the temperature of the mixture is maintained at 20° to 250°C during the reaction.

12. A process according to claim 9 wherein said filler material is clay.

13. A process according to claim 9 wherein said filler material is glass fiber.

14. The process of claim 10 wherein said compatibilized filled polymer composition is dispersed in a polymer having the same chemical composition as said first polymer.

15. A process according to claim 9 wherein said second polymer is selected from the group consisting of styrene-maleic acid copolymer, styrene-maleic anhydride copolymer, and styrene-acrylic acid copolymer and has a styrene: carboxyl component molar ratio of about 1:1 to 4:1.

16. The process of claim 15 wherein the temperature of the mixture is maintained at about 100° to 200°C during the reaction.

17. The process of claim 15 wherein the carboxyl-containing copolymer is present at a concentration of about 0.5 to 10%, based on the total weight of mono- or diolefin polymer and carboxyl-containing copolymer.

18. A process according to claim 15 wherein said low molecular weight thermoplastic carboxyl-containing copolymer has a number average molecular weight of about 500 to 4000.

* * * * *

UNITED STATES PATENT OFFICE
CERTIFICATE OF CORRECTION

PATENT NO. : 3,966,672
DATED : June 29, 1976
INVENTOR(S) : Norman G. Gaylord

It is certified that error appears in the above-identified patent and that said Letters Patent are hereby corrected as shown below:

Claim 11, line 2 after "at" insert ...about....

Claim 14, line 1, change "claim 10" to ...claim 9....

Signed and Sealed this

Nineteenth Day of October 1976

[SEAL]

Attest:

RUTH C. MASON
*Attesting Officer*

C. MARSHALL DANN
*Commissioner of Patents and Trademarks*